UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

AGRICULTURAL-SPRAY COMPOSITION.

1,002,247. Specification of Letters Patent. Patented Sept. 5, 1911.

No Drawing. Application filed May 1, 1911. Serial No. 624,355.

*To all whom it may concern:*

Be it known that I, CARLETON ELLIS, a citizen of the United States, and resident of Montclair, in the county of Essex and State of New Jersey, have invented certain new and useful Improvements in Agricultural-Spray Compositions, of which the following is a specification.

This invention relates to agricultural sprays and relates in particular to spraying mixtures containing sulfur, especially those prepared from lime or other alkaline earth bases or alkalis.

When heated with sulfur in the presence of water, calcium oxid forms a series of sulfids, having varying amounts of sulfur. Those compounds containing a greater proportion of sulfur than one equivalent of lime to one of sulfur are known as polysulfids and these latter compounds are the ones which particularly concern the present invention. The sulfur compounds which are most effective in the treatment of foliage to destroy scale, rustmite and the like, are the tetrasulfid and the pentasulfid of lime. It is probable however, that the insecticidal action of these compounds is, to a very considerable degree due to the formation by oxidation of calcium thiosulfate, dithionate, trithionate and the like. The oxidation of the tetrasulfid and pentasulfid of lime on foliage gives rise to the separation of free sulfur and the oxidation products referred to. Probably the free sulfur has some insecticidal value, but in all probability the oxidation products, which are more or less soluble, have greater efficiency in certain respects. It has been supposed heretofore that the calcium thiosulfate was, perhaps, a disadvantageous constituent of lime sulfur washes, and the tendency has been to curtail the time of boiling so as to prevent the formation of oxy compounds as far as possible and thus to reduce the amount of calcium sulfite formed. The latter is presumably an oxidation product of the thiosulfate and being but very slightly soluble forms a very undesirable sediment in the spraying composition.

In the present invention the production of the thiosulfate by the proper boiling of the composition, or by selective oxidation in other ways, is regarded as being desirable, especially for certain applications. The treatment of a lime sulfur composition, so as to oxidize polysulfids to thiosulfates, dithionates, trithionates and the like by such selective oxidation, repressing as far as possible the formation of calcium sulfite, gives rise to a spraying composition which is particularly effective for the destruction of certain kinds of insects.

The boiling of lime sulfur, as ordinarily conducted, consists in mixing about 50 lbs. of quick lime with sufficient water to slake it, adding 100 lbs. of flowers of sulfur or ground brimstone together with sufficient water to make about 50 gallons and boiling with stirring from forty-five minutes to one hour. The liquid is then decanted from the sediment and is ready for use. Of course other proportions of lime and sulfur than these are used occasionally, the practice varying slightly in different sections of the country. The proportion of soluble sulfur and its chemical composition varies with the different proportions used and the time of boiling.

The selection of the materials for the sulfur wash calls for quick lime of a high degree of purity to produce a composition fairly free from sediment. Magnesium oxid is not regarded as a desirable ingredient of the quick lime, because the magnesium sulfhydrate which forms during the boiling very easily decomposes, producing hydrogen sulfid gas, and sulfur is therefore lost in this way. The ratio of the lime and sulfur to the water in the preparation of the ordinary lime wash varies from 1:2.7 to about 1:2.9. In a lime sulfur mixture of the character above mentioned the amount of sediment may vary from 5 to 25 lbs., based on the use of 50 lbs. of lime to 100 lbs. of sulfur. The largest amount of sediment occurs when the excess of sulfur is greatest in proportion to lime, as for example 2.5:1 or 3:1. The ratio is very low when the ratio of lime to sulfur is about 1 to 2, and as the ratio of sulfur increases the sediment becomes more pronounced.

In the present invention one of the objects is to produce a concentrated spraying mixture which is as free as possible from sediment and unconverted materials, so that there will be freedom from trouble in producing a clear composition and practically no loss from unconverted stock; and the manner in which this result is secured will be hereinafter described.

As might be expected, the proportion of sulfur which goes into solution is least when this proportion is greatest, that is when say 2½ or 3 parts of sulfur are used to 1 part of lime and the solution of the sulfur increases as the proportion of sulfur decreases until a point is reached where practically all of the sulfur has changed into soluble compounds, this being when sulfur to the extent of about 2.2 times the amount of the lime is employed.

Inasmuch as the present invention in its preferred form contemplates the production of a substantial proportion of the thiosulfates, dithionates, trithionates and the like for certain applications, it becomes desirable to ascertain the conditions yielding the largest proportion of polysulfids. The tetrasulfids and the pentasulfids of calcium are formed in the largest amount when the ratio of lime to sulfur ranges from about 2.2:1 down to 2:1. The amount of polysulfid sulfur decreases when the lime stands to sulfur in greater than 1 to 2. On the other hand larger amounts of thiosulfate, dithionate, trithionate compounds are formed under ordinary conditions in the usual practice when the lime is used in still greater proportion as regards the sulfur. It is necessary therefore, in the production of a maximum of soluble oxidation products to consider these conditions, namely, that the polysulfids are formed more easily when the ratio of sulfur is high, while oxidation to thiosulfate and the like takes place more readily when the lime ratio is high. Thus it becomes necessary to find a ratio intermediate the two extreme ratios when such oxidation products are desired. The amount of lime which goes into solution is greatest when the proportion of sulfur is more than twice that of the amount of lime and the complete solution of the lime, as far as possible, is desired in order to secure a composition adapted for treatment by selective oxidation. It is of course desirable to have a maximum amount of sulfur in relation to lime, except in those cases where the oxidation products are desired. The amount of sulfur which may be in solution however is limited, and usually does not exceed 2.1 to 2.2 parts for each part of lime. If the sulfur is used in the maximum quantity it will be found in the sediment and as these sediments are very difficult to re-treat satisfactorily, the sulfur which remains undissolved is ordinarily wasted. Again it appears that calcium pentasulfid is formed in the largest proportion when the sulfur is used slightly in excess. If the sulfur is used in less proportion than 2¼ parts to one part of lime, less pentasulfid is formed, with a corresponding increase in the amount of tetrasulfid. It becomes necessary to bear these considerations in mind in connection with certain features of this invention especially for those cases where a special compound such as the dithionate, is required to be present in substantial amount.

In connection with the boiling of the sulfur compositions, variation in the proportion of water employed makes some difference. For example in the composition mentioned above where 50 lbs. of lime are used to 100 lbs. of sulfur, a variation of the amount of water used may be had from 60 down to 35 gallons, more or less, but it appears that in operating with a more concentrated solution, the selective oxidation referred to, is not as readily controllable; or at least is not carried on as easily as in the case where more dilute solutions are used. The proportion of sulfur appearing in solution in the form of polysulfids does not vary materially whether more or less water is used, while on the other hand, the proportion of the thiosulfate, for example, apparently decreases with the proportion of water used, owing possibly, to the concentration of these thiosulfates to such an extent that insoluble calcium sulfite is readily formed and of course separates from solution. The proportion of lime passing into solution is greatest when the amount of water employed is large. The concentration of a rather dilute solution of the lime sulfur down to a more concentrated form gives rise to the formation of thiosulfate and subsequent production of the sulfite with the separation of the free sulfur. If the amount of lime present is sufficient to combine with the separated sulfur, the latter redissolves.

It has been supposed, in the making of lime sulfur solutions under the ordinary formulas, that 15% to 20% of the sulfur employed goes to form a calcium thiosulfate, which is changed to a greater or less extent into sulfite; the amount so changed depending upon the length of time of boiling and the degree of concentration of the solution.

In the present invention, the methods employed for the production of a sulfur spray will be described more particularly from the point of view of the production of the lime and sulfur composition, but it may be noted that potash, soda or ammonia, or their bases may be used. Barium oxid or hydrate is useful material in the production of a sulfur wash as barium sulfids and other salts are especially toxic.

The precise formula to be employed depends upon the foliage which is being treated and the insects which the material is intended to destroy. For example conditions in the North are different from those in the South, and in consequence, sprays intended for one section of the country may not be applicable in another section.

The present invention has particularly for its object the treatment of citrus trees for the destruction of rustmite, scale, thrips, red spider, white fly, sooty mold, gummosis, scaly bark, withertip, dieback, stem end rot, and the like.

The present practice in citrus growing regions is to spray for rustmite, with ordinary lime sulfur or soda sulfur mixtures. These destroy the fungi preying upon the scale insects and often give rise to an excessive multiplication of scale. It becomes necessary then perhaps to treat with a miscible oil, or with kerosene emulsion to keep down the scale. This however, does not have much effect upon the white fly and other pests so that spraying with whale oil soap, rosin wash, Bordeaux mixture and the like also may be required. The result of such a series of spraying as that the cost of raising fruit is greatly increased. The actual cost of an insecticide or fungicide is perhaps not in itself a very large item, but the spraying cost represents a considerable outlay, as several men are required to operate the spraying engine and nozzles and prepare the solutions. Hence such numerous treatments constitute a very expensive item in the operation of a citrus grove. The present invention sets forth certain compositions which are primarily intended to act upon the several most important insects and fungi destructive to citrus growth, so that a material reduction in the number of sprayings is effected. The present invention also discloses a number of formulas for use with the lime sulfur or the polysulfid compositions, but which are not necessarily required with them, their use depending upon the special conditions which confront the operator. Thus the user of the compositions comprised in the present invention is able to understandingly apply the polysulfid sprays to advantage in conjunction with the other compositions mentioned, to form compatible mixtures capable of simultaneous application, etc.

As previously stated, the specific features of the present invention which relate to a composition containing sulfur and alkali, consists in producing a solution of polysulfid and in preferably selectively oxidizing such a solution. This may be accomplished by treatment with an air current, or better by gaseous current, having a reduced oxygen content, until the desired amount of thiosulfate, dithionate, trithionate, etc., has been developed in the composition. My invention contemplates the introduction of arsenic into such compositions, preferably in the form of a sulfid of arsenic, so as to form an alkali thioarsenate. Ordinarily the soluble compounds of arsenic, especially if used in effective strength for insects, have a defoliating action, but in the present case, by the exposure of a solution of for example, potassium thioarsenate, oxidation and carbonation takes place more or less in the case of the polysulfid, thereby throwing out of the solution to a very considerable degree the previously dissolved sulfid of arsenic, and rendering the arsenical comparatively harmless to vegetation. This action is especially marked in the case of the polysulfid of calcium.

A formula illustrative of the present invention is made by placing 95 lbs. of sulfur in a suitable kettle, adding water to make a paste, then adding 45 lbs. of quick lime which is allowed to slake with stirring and the addition of water to prevent the formation of too thick a paste. When the lime has been slaked to form a cream about 40 gallons of water are added, steam is blown into the kettle, while external heat is preferably applied, so that the mixture is vigorously boiled. It should be stated that the kettle is preferably equipped with an efficient stirring apparatus, which is capable of removing the sulfur from the bottom of the kettle and elevating it into the solution. The boiling is continued for about one hour when most of the sulfur and lime have gone into solution. A mixture of air and inert gas in the proportion of about 2 parts of air to 3 parts of inert gas is then allowed to bubble slowly through the solution with continuous stirring. This may be continued for a period of about 15 or 20 minutes according to the amount of oxidation desired. A solution of sulfid of arsenic, (either yellow or red sulfid) is prepared by heating with a solution of caustic potash or sulfid of potash. Five pounds of yellow sulfid of arsenic, for example, are dissolved in aqueous solution containing 10 lbs. of caustic potash or potash sulfid and this solution added to the contents of the kettle. To further improve the adhesive qualities of the mixture, I also prefer to add a small quantity of waste sulfite liquor, obtained from sulfite paper mills. This material contains a considerable proportion of calcium lignosulfonate which has a very desirable binding action when the spray is applied to the foliage, thereby causing greater adherence of the composition to vegetation. To the 45 lbs. of lime and the 95 lbs. of sulfur mentioned in the foregoing illustrative formula, I add preferably 1 gal. of concentrated and neutralized waste sulfur liquor of a gravity of about 30 or 32 degrees Baumé. The mixture is boiled for 15 minutes or thereabout, producing about 47 gallons of lime-potash sulfur arsenic spray, having a specific gravity of from 28 to 30 degrees Baumé, or thereabout.

In lieu of the foregoing composition a sulfur spray may be used by adding potash or soda in the caustic condition to form polysulfid of potash or soda respectively or the mixed alkalis of potash and soda may be used, with or without the addition of lime or barium oxid or hydroxid. An illustrative formula is as follows:—100 lbs. of flowers of sulfur is placed in a kettle and water is added to make a paste. 40 lbs. of caustic potash is introduced and 20 or 30 gallons of water. This mixture is boiled about 15 minutes and then 10 lbs. of sulfid of arsenic are introduced. The composition is boiled 15 minutes longer and is then allowed to clarify by settling and the clear liquid withdrawn. The potash is a slightly better solvent than the soda, and while more costly, is perhaps cheaper in the end because the potash thus employed is carried into the soil when it is ultimately washed from the vegetation and thus has a fertilizing action. An ammonium sulfid may be prepared of somewhat similar character but from the lime and sulfur base, by the introduction of ammonium carbonate. Thus it becomes possible to produce a spray that has both potash and nitrogen which materials are of assistance in fertilizing the soil.

The potash and soda sulfur sprays are rather caustic while the lime composition is remarkably free from caustic action, even in concentrated form and the danger of defoliation in its use is relatively slight. It possesses the disadvantage that is does not permit the admixture of rosin soap or whale oil soap, owing to the formation of an insoluble calcium soap under such circumstances. This is not the case however, with the potash or soda polysulfid, which can be used with the soaps mentioned and others.

In using the concentrated sulfur composition for the rustmite, it is diluted to about 1 to 100 parts of water. For the larva of white-fly, (*Aleroydes citri*) three to four parts of the sulfur wash may used per 100 parts of water. In this case it is also advisable to combine rosin soap or whale oil soap in the case of the soda or potash polysulfids and a scalecidal composition, such as disclosed in U. S. Patent No. 896,094, with the lime polysulfids. The composition referred to in the aforesaid patent is a solution or mixture of petroleum oil, in or with concentrated waste sulfite liquor, and the latter possesses the quality of mixing with lime polysulfid without appreciable reaction. To further strengthen the action of such a spray, copper oleate may be dissolved in the petroleum oil employed with the waste sulfite liquor. The compositions made with these waste sulfite liquors are also valuable for use where hard water is employed for dilution. In the case of the ordinary miscible oil or kerosene oil emulsion made with soap, the lime contained in hard water unites with the soap, forming an insoluble lime soap, which collects as a coagulum and has a tendency to clog the spray nozzle. With the concentrated waste sulfite liquor, I have found that the principal component, calcium ligno-sulfonate is capable of dissolving petroleum oils in the cold and that these mixtures can be combined with the lime sulfur spray so that the valuable properties of the calcium polysulfids, petroleum and calcium sulfonate may be simultaneously exerted.

An illustration of a rosin composition suitable for combining with the potash sulfur mixture in order to get the desirable joint action of both the sulfur and the rosin, is as follows:—10 lbs. of powdered rosin are saponified with 2 lbs. of caustic potash, using a sufficient quantity of water to make a syrupy mixture. This is combined with an equal amount of the potash sulfur mixture preferably containing dissolved yellow sulfid of arsenic. In this case it will be observed that although there is sufficient potash present in the spray when exposed on the foliage to maintain some of the arsenic sulfid in solution and in solution to such extent in fact, that in the absence of the resin it would probably exert detrimental effects on the foliage, yet in the presence of the resin, the arsenical is sealed to a certain extent from action on the foliage, while it is present in so effective a form, that the toxic action on insect life is pronounced.

Another composition is made by dissolving 20 pounds of powdered rosin, in 25 pounds of water and 5 pounds of concentrated ammonia. This gives a thick syrup in which essential oils and some petroleum oils and the like as well as carbolic acid, cresylic acid, etc., dissolve readily. To the above mixture of ammonium resinate, two to three pounds of Russian turpentine or crude pine oil may be added to advantage. If then a mixture of this character is introduced into hard water, the rosin lime soap which thus forms is softened and even dissolved by the Russian turpentine. There is thus less liability of forming a coagulum capable of clogging the spraying nozzles. Such clear solutions of ammonium resinate and essential or hydrocarbon oils, when mixed with water, of course separate the oil or hydrocarbon more or less, but the oil is in such a finely divided state that it remains suspended in solution for a long period of time. The addition of such a spraying composition to ammonium polysulfid makes an especially effective spray.

Another composition is made from 20 parts of powdered rosin, 20 parts of water, 10 parts of concentrated ammonia and 3 parts of ammonium arsenite or arsenate. Such a composition cannot be added to the lime solution spray to good advantage because of the precipitation of the calcium arsenite or arsenate which is insoluble. A precipitate of this sort would be regarded as objectionable in some sections, especially where the operator is accustomed to working with clear solutions. The ammonium arsenite or arsenate is of course dangerous to foliage when used alone, but when sealed by means of ammonium resinate it does not have a deleterious effect. The ammonium resinate has the advantage over resinate of soda potash in that the ammonia is volatile, and on evaporation, when exposed on the leaves it leaves a film of resin which is practically insoluble. This film of water insoluble material is very effective in sealing larva or pupa of the white fly and the like, thereby destroying them.

Another illustrative formula consists in taking equal parts of lime sulfur solution referred to above and a mixture composed of equal parts of concentrated waste sulfite liquor and spindle oil. This is of course suitably diluted to make a spraying composition of the proper strength.

In some cases where it is desired to secure a fungicidal effect of copper in such mixtures, copper may be introduced in the form of copper oleate, as indicated above, or the waste sulfite liquor may be treated with copper sulfate, thereby precipitating the lime as calcium sulfate and forming copper lignosulfonate in solution. Still another way is to make a mixture of concentrated sulfite liquor, petroleum oil and lime sulfur composition carrying the oil in an emulsified form, or finely divided condition, due to precipitation from its solution in the waste sulfite liquor on the addition of the polysulfid solution. Copper sulfate in moderate quantity may then be added to this composition, the copper salt being thus transformed into a state in which it is fairly effective.

Still another method of combining the sulfur and the rosin materials to form a soluble spray, consists in fusing rosin and sulfur together, and grinding to a powder. This material is then saponified with caustic soda, or caustic potash to form a mixture of alkali polysulfid and rosin soap. Owing to the fine subdivision of the particles during saponification, caused by selective solution of the ingredients, the composition is secured in a very effective form. This mixture may be oxidized by means of a current of steam containing a small amount of air. To the composition may be added 5% to 10% of sodium fluorid or fluosilicate. The addition of water glass also aids in the binding action of such a composition giving it greater adherence to the foliage.

Such compounds as potassium cyanid, or ammonium cyanid ordinarily cannot well be used for spraying purposes owing to the defoliating action if used in effective insecticidal strength. When these are combined however, with ammonium or potassium resinate, waste sulfite liquors and soda or potash polysulfid compositions, they exert an insecticidal action which is not injurious to foliage.

The barium sulfid compositions may be made in a similar way to that of the lime mixture and incorporated with barium thioarsenate to good advantage. The use of a spray of this character, followed by a spray of cupric fluosilicate, or of certain compounds of copper with formaldehyde and sulfurous acid constitute an effective method of treatment in some instances. The copper formaldehyde compound referred to is made by suspending copper hydrate in a 40% solution of formaldehyde and passing in sulfurous acid gas until the copper goes into solution.

A composition containing barium sulfid is made by boiling 130 lbs. of barium hydrate and 30 lbs. of quick lime with 100 parts of sulfur, 5 parts of sulfid of arsenic and 50 galls. of water.

A rosin composition containing arsenic sulfid in a particularly active form is made by dissolving 5 lbs. of ordinary commercial sulfid of arsenic in 8 lbs. of caustic potash dissolved in water. The solution is used for saponifying rosin employing about 6 parts of rosin to one part of caustic potash. The composition so prepared should take the form of a thick syrup which readily mixes with water thereby separating the sulfid of arsenic in an insoluble condition as a yellow suspension or precipitate, which is however, so finely divided that even with very great dilution the solution remains for a long period of time of a pronounced yellow color, but without evidence of any actual particles of the sulfid of arsenic in a concentrated form. On standing for several days such a diluted mixture deposits the yellow sulfid of arsenic. The composition offers a means of producing a rosin wash containing an insoluble arsenical in such a form that it is readily distributed uniformly over the foliage. By combining such a composition with the sulfur potash or sulfur soda mixture, a very effective spray is secured.

To recapitulate, my invention consists primarily in a composition for agricultural spraying purposes, comprising a soluble form of alkali or alkaline earth polysulfids preferably in conjunction with a thioarsenate or other thioarsenical compound as a strengthening material and preferably with a binding or adhesive material, such as waste sulfite liquor in the case of lime polysulfid and rosin soap in the case of soda or potash polysulfid; and further preferably oxidized to form a substantial proportion of thiosulfate and similar oxy-sulfur compounds.

What I claim is,

1. An agricultural spraying composition, comprising a water-soluble polysulfid and a thioarsenical compound.

2. An agricultural spraying composition comprising soluble polysulfids, soluble salts of the oxy-sulfur acids, a soluble arsenical compound and a binding and adhesive material.

3. An agricultural spraying composition comprising a soluble polysulfid, a soluble salt of an oxy-sulfur acid, a sulfur compound of arsenic and binding and adhesive material.

4. An agricultural spraying composition comprising calcium polysulfid, soluble salts of oxy-sulfur acids, a sulfur compound of arsenic and binding and adhesive material.

5. An agricultural spraying composition, comprising a calcium polysulfid, a soluble salt of an oxy-sulfur acid and calcium thioarsenite.

6. A spraying composition comprising calcium polysulfid, a soluble salt of an oxy-sulfur acid, calcium thioarsenite and concentrated waste sulfite cellulose liquor.

7. A spraying composition comprising a concentrated solution of a water soluble polysulfid and a modicum of a sulfur compound of arsenic soluble therein.

8. A spraying composition comprising a concentrated solution of calcium polysulfid and a modicum of calcium thioarsenite.

Signed at Montclair in the county of Essex and State of New Jersey this 11th day of April A. D. 1911.

CARLETON ELLIS.

Witnesses:
SYDNEY M. SPEDON,
NATHANIEL L. FOSTER.